Sept. 5, 1961  H. R. WILSON  2,998,813
MASONRY SAW
Filed Oct. 1, 1959  3 Sheets-Sheet 3

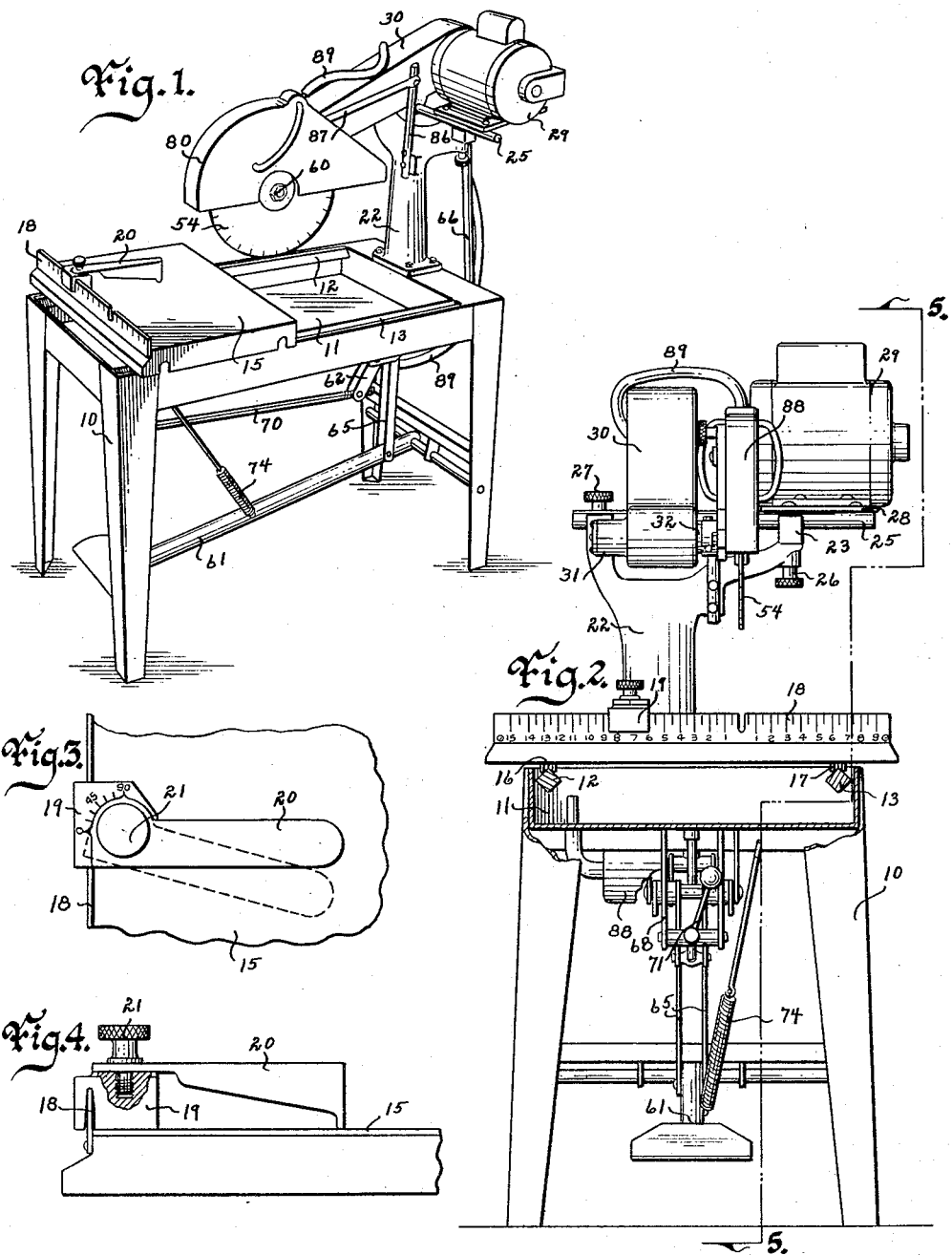

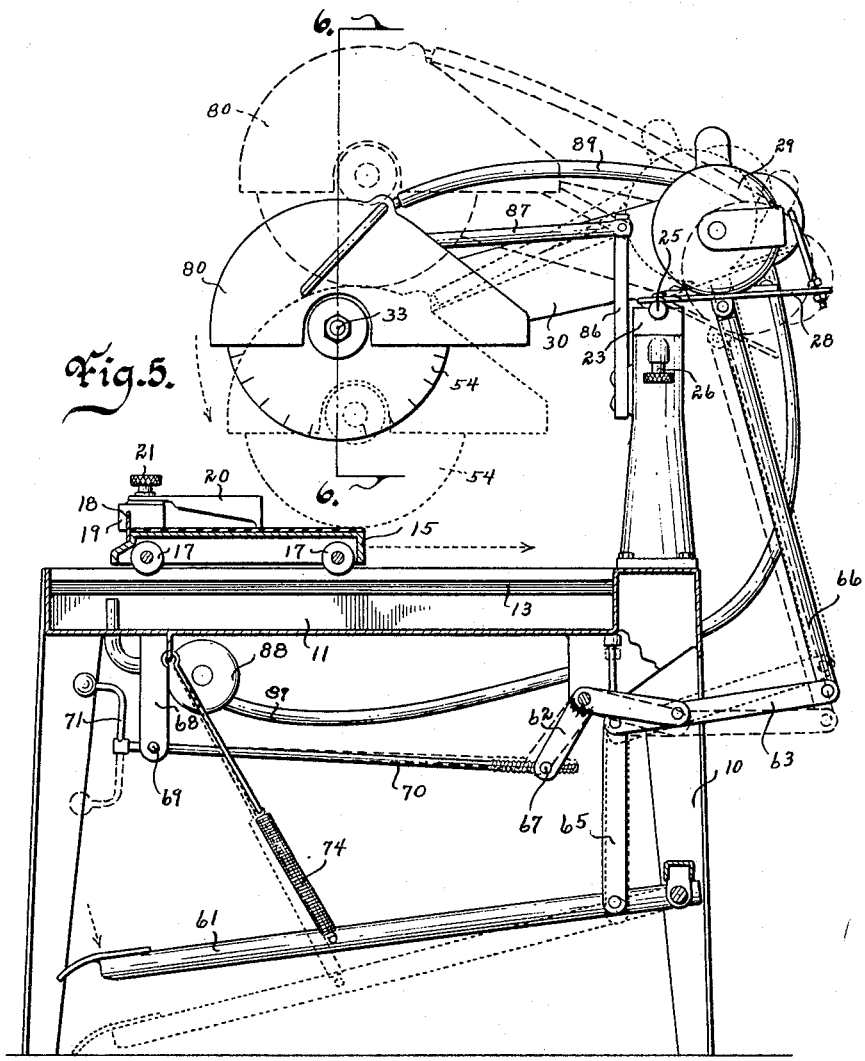

Inventor
Harry R. Wilson
by M Talbert Dick
Attorney

Witness
Edward P. Seeley

United States Patent Office 2,998,813
Patented Sept. 5, 1961

2,998,813
MASONRY SAW
Harry R. Wilson, 327 Anthony, Waterloo, Iowa
Filed Oct. 1, 1959, Ser. No. 843,799
6 Claims. (Cl. 125—13)

This invention relates to saws and more particularly to a saw for cutting masonry such as cement blocks, cinder blocks, shale blocks, masonry lintels, masonry slabs, ceramic items and like.

In the construction of building and installations wherein masonry is used it is often found that the standard building block or unit does not correctly fit the place into which it is to be installed. The only solution is the proper cutting or trimming of the masonry item to a size or shape necessary for the job at hand. Therefore in rather recent times a great number of masonry saws have been placed on the market. In general such masonry saws are similar to the common and well known powered wood saws except for blade construction. Many of these blades are diamond blades for cutting extremely hard materials. However, regardless of the type of blade, all masonry blades are most expensive. If the blade is not accurately held and rotated, it will bind, or vibrate and break, thereby making a very high cost operation.

Another objection to the present masonry saw construction is that the masonry block carrying means is subject to malfunction. Still another objection is that the saw blade hood does not remain horizontal resulting in its possible objectionable contact with the masonry block being cut.

Therefore one of the principal objects of my invention is to provide a masonry saw that insures long blade life.

A further object of this invention is to provide a masonry saw that is capable of accurately and smoothly moving a masonry item into the blade path.

A still further object of this invention is to provide a highly adjustable masonry saw capable of successfully handling all types of masonry block work.

A still further object of this invention is to provide a masonry saw that maintains the saw hood in a horizontal position throughout the saw's operation.

A still further object of this invention is to provide an easily operated masonry saw that does not require the services of a skilled workman.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my masonry saw ready for use;

FIG. 2 is a front view of the masonry saw;

FIG. 3 is a enlarged top view of the adjustable block holding arm;

FIG. 4 is an enlarged side view of the adjustable block holding arm with a section cut away to illustrate its construction;

FIG. 5 is a side sectional view of my saw and more fully shows its construction and operation. This view is taken from 5—5 of FIG. 4;

Figure 6:
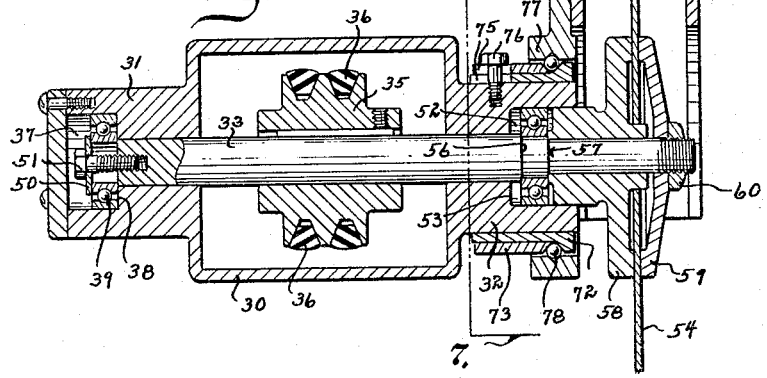
FIG. 6 is an enlarged vertical sectional view of the saw head taken on line 6—6 of FIG. 5.
Figure 7:
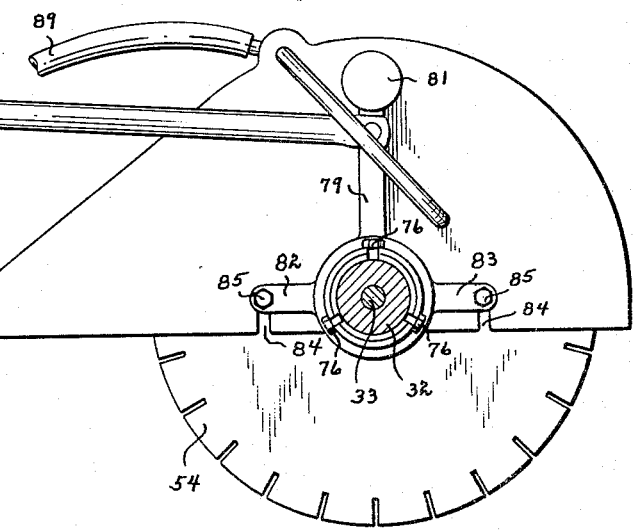
FIG. 7 is an enlarged side view of the saw head taken from line 7—7 of FIG. 6.

In these drawings I have used the numeral 10 to designate the saw frame having the top tray portion 11. Within the tray portion are two spaced apart longitudinally extending horizontal track rails 12 and 13. These track rails are rectangular in cross section with one edge uppermost as shown in FIG. 2. The numeral 15 designates the material holding table platform having V-grooved roller wheels 16 and 17. The grooved rollers conform to the V-structure of the two rails 12 and 13. The roller wheels rotatably engage the two track rails, respectively, and automatically center thereon. The table platform is held above and completely out of direct contact with the rim of the tray 11. This is important inasmuch as the walls of trays are easily and quickly damaged and distorted and if the table platform were to operate on or with them, the device would soon become inaccurate and inoperable. Also, in masonry saws there is much dirt and waste materials and the angular structure of the tops of the track rails aids in shedding all such foreign material. On the rear of the table is a horizontal gauge strip 18. Slidably embracing this gauge 18 is the block 19. The numeral 20 designates an ordinary angle arm block holder adjustably secured to the block 19 by a cap screw 21 as shown in FIGS. 3 and 4. The numeral 22 is a post arbor extending upwardly from the saw frame as shown in FIG. 1. At the top of the post is forked groove bearing head 23 rotatably supporting a horizontal shaft 25. This shaft may be adjustably vertically canted by the adjustment of the two cap screws 26 and 27. The numeral 28 designates a motor platform rigidly secured to the shaft 25 and extending rearwardly from the post 22, which is located at the rear of the frame 10. This platform carries the electric motor 29. Rigidly secured to the motor is a forwardly extending belt transmission housing 30. On the forward end portion of the housing 30 and at each side thereof is a bearing member 31 and a bearing member 32. The numeral 33 designates a shaft rotatably mounted in these two bearing members and extending through the housing 30 as shown in FIG. 6. The shaft 33 does not extend completely through the bearing 31, but it does extend through and beyond the bearing 32. The numeral 35 designates a pulley wheel keyed on the shaft 33, inside the housing 30 and carrying belts 36 which extend rearwardly in the belt housing and embrace a pulley wheel (not shown) on the motor shaft. Thus when the motor 29 is running the shaft 33 will be rotated. In the outer end of the bearing 31 is a well 37 having a shoulder 38. The numeral 39 designates a ball bearing race rotatably mounted in the well 37 and having its sliding movement toward the belt housing limited by the shoulder 38. The numeral 50 designates a washer engaging the outside of the inner ring of the ball bearing race. The numeral 51 designates a cap screw extending through the washer 50 and threaded into the left end of the shaft 33, thereby securing the shaft to the inner ring of the ball bearing race. The numeral 52 designates a well in the outer end of the bearing 32 having the shoulder 53. The numeral 55 designates a ball bearing race rotatably mounted in the well 52 and slidably limited in its movement toward the belt housing by the shoulder 53. The numeral 56 is a shoulder on the shaft 33 engaging the left side of the inner ring of the ball bearing race 55. The numeral 57 designates a second reducing shoulder around the shaft located adjacent the outer side of the inner ring of the ball bearing race 55. The numeral 58 designates the saw hub embracing the right end of the shaft 33, extending into the well 52, engaging only the right side of the inner ring of the ball bearing race 55, and engaging the shoulder 57 of the shaft 33. This hub has the usual blade holding detachable plate 59, and nut 60 threaded into the right end of the shaft 33. The numeral 54 designates the usual circular saw blade held on the hub by the plate and nut. The numeral 61 designates a foot lever pivoted to the frame at its rear end and extending toward the operator. The numeral 62 designates an L-shaped link pivoted at its center to the frame and above the foot lever. The numeral 63 designates the horizontal link pivoted between its two ends to one end of the L-shaped link as shown in FIG. 5. The numeral 65 designates a vertical link pivoted at its lower end to the foot lever and pivoted at its upper end to one end of the link 63. The numeral 66 designates a vertical link pivoted at its lower end to the other end of the link 63 and its upper end pivoted to the motor platform 28. To insure alignment, the links 62, 63, 65 are each double bar links as shown in FIG. 2. The two bars that make up the link 62 have rotatably secured to their other end a bearing member 67. The numeral 68 designates ears on the bottom of the tray 11, extending downwardly and carrying the rotatable bearing member 69. The numeral 70 designates a rod rotatably, but not slidably, extending through the bearing 69 and threaded through the bearing 67. The numeral 71 designates a crank arm on the rod 70. By this arrangement of parts when the foot lever is manually forced down against the action of the spring 74, the linkage will raise the motor platform, thus lowering the saw blade toward the platform 15 as shown by broken lines in FIG. 5. However the maximum downward position of the saw blade will depend on the position of the linkage 62 inasmuch as one end of the same is the basic pivot point of all the other linkage means. Therefore the limit of downward movement of the saw blade may be adjusted by the hand crank 71. The numeral 72 designates a collar embracing the bearing 32 and having its right end outer surface extending radially outwardly and to the right to provide one side of a ball bearing groove as shown in FIG. 6. The numeral 73 designates a collar slidably embracing the collar 72 and having its right end edge extending radially inward and to the right to provide the other side of a ball bearing groove. Both collars have a longitudinal slot 75. The numeral 76 designates a cap screw extending through the slot 75 and threaded in the bearing 32. The numeral 77 designates a ring rotatably mounted around the collars 72 and 73 and having an inner ball bearing groove complementing the ball bearing groove created by the two collar end structures. The numeral 78 designates ball bearings between these two grooves. The numeral 79 designates an arm radially extending outward from the ring 77. The numeral 80 designates the saw blade hood for shielding the upper one-half of the saw blade. This hood is adjacent the arm 79 and the numeral 81 designates a cap screw extending through the arm and threaded into the hood. The numerals 82 and 83 designate two additional radial arms extending from the ring 77 and horizontally adjacent the hood 80 near its lower edge as shown in FIG. 7. The numeral 84 designates two open notches in the lower side wall of the hood. The numeral 85 designates bolts extending through the arms 82 and 83 and the slots 84 respectively, of the hood. By this arrangement the hood may be easily and quickly removed by merely loosening the bolts 85 and removing the cap screw 81. While the hood 80 moves upwardly and downwardly with the upwardly and downwardly movement of the saw blade, it is highly desirable that the lower marginal edge of the hood remain horizontal throughout the arcuate movement of the saw blade and the belt housing in order that there would be no tilting of the hood to interfere with the work. Therefore to maintain the horizontal attitude of the hood I provide a post 86 on the post 22 with the levelling arm 87 hinged at one end to the upper end of the post 86 and its other end hinged to the outer end portion of the arm 79 as shown in FIG. 7. The numeral 88 designates a motorized water pump having its intake communicating with the inside of the tray 11 as shown in FIG. 2. The numeral 89 designates a conduit having one end communicating with the outlet port of the pump 88 and its other end terminating inside the upper portion of the hood 80. By this construction water will be continuously furnished to the saw blade, collected in the tray 11 and again used during the masonry cutting operation. To operate the device the piece of masonry to be cut is placed on the movable table platform 15. If the maximum lowerable position of the saw has been set by the crank arm 71, it is then merely necessary to manually move the foot lever 91 downwardly to bring the saw blade to a position in front of the masonry to be cut. The platform 15 is then moved toward the saw blade carrying with it the masonry to be processed. After the masonry has been cut pressure is released from the foot lever 61 and the spring 74 raises the saw blade unit upwardly and free of the masonry. The platform 15 is then rolled in a direction away from under the saw blade. While the removal of the hood is a simple matter as herebefore explained, it will also be noted that the entire unit supported and held by the post 22 may also be quickly and easily removed.

Obviously, each time the saw blade is lowered or raised, the hood will rotate about the bearing 32 and considerable wear would therefore rapidly take place. However, by the construction shown in FIG. 6 the hood is not only rotatably mounted on ball bearings but the structure is capable of easily being adjusted for wear. With the wearing of any of the ball bearings or the grooves in which the ball bearings operate, it is a simple matter to compensate for such wear by loosening the cap screws 76 and readjust the collars 72 and 73 relative to each other to move the ball bearings radially outwardly and into tighter contact with the ball bearing groove of the ring 77. After the adjustment has been made, the cap screws 76 are tightened. One more of these cap screws 76 may be used in the structure. In FIG. 7 I show three cap screws 76. By my method of holding and supporting the shaft 33 the rotating saw blade will have a floating action laterally. While this floating action will be of a limited nature it does not permit the blade certain operating tolerances in the masonry block thereby eliminating excessive wearing, binding and breakage of the costly blade.

Some changes may be made in the construction and arrangement of my masonry saw without departing from the real spirit and purpose of my invention, and it is my intention to cover by my claims, any modified forms of structure or use of mechanical equivalents which may be reasonably included within their scope.

I claim:

1. In a saw, a frame, a platform operatively hinged to said frame, means for moving said platform to various positions of its swing movement, a motor on said platform, a transmission housing extending from said motor, a bearing on the free end of said transmission housing, a shaft rotatably mounted in said bearing and adapted to be operatively connected to said motor, a circular saw blade on said shaft, a collar slidably adjustable on said bearing and having a flared portion forming one side of a ball bearing groove, a second collar slidably adjustable on said first collar and having one of its ends tapered to form the other side of a ball bearing groove, a ring rotatably mounted around said two collars having a ball bearing groove, ball bearings in said two ball bearing grooves, a hood structure secured to said ring and shielding the upper area of said saw blade, and a means for maintaining said hood in a horizontal attitude throughout the arcuate swing movement of said platform, motor, housing and saw blade.

2. In a saw, a frame, a platform operatively hinged to said frame, means for moving said platform to various positions of its swing movement, a motor on said platform, a transmission housing extending from said motor, a bearing on the free end of said transmission housing, a shaft rotatably mounted in said bearing and adapted to be operatively connected to said motor, a circular saw blade on said shaft, a collar slidably adjustable on said bearing and having a flared portion forming one side of a ball bearing groove, a second collar slidably adjustable on said first collar and having one of its ends tapered to form the other side of a ball bearing groove, a ring rotatably mounted around said two collars having a ball bearing groove, ball bearings in said two ball bearing grooves, a hood structure secured to said ring and shielding the upper area of said saw blade, a post on said frame, and a link having one end hinged to said post and its other end operatively hinged to said hood.

3. In a saw, a frame, a platform operatively hinged to said frame, means for moving said platform to various positions of its swing movement, a motor on said platform, a transmission housing extending from said motor, a bearing on the free end of said transmission housing, a shaft rotatably mounted in said bearing and adapted to be operatively connected to said motor, a circular saw blade on said shaft, a hood structure rotatably embracing said bearing and shielding the upper area of said saw blade, and a means for maintaining said hood in a horizontal attitude throughout the arcuate swing movement of said platform, motor, housing and saw blade; said means for moving said platform including a foot lever, a link pivoted at its center, a second link pivoted at one end to said foot lever and pivoted at its other end to one end of said first link, a third link having one end pivoted to the other end of said first link and its other end pivoted to said platform; said first link having its center pivot connected to one end of an L-link with the L-link pivoted to said frame at its center, and a means for adjustably positioning and holding the other end of said L-link.

4. In a saw, a frame, a platform operatively hinged to said frame, means for moving said platform to various positions of its swing movement, a motor on said platform, a transmission housing extending from said motor, a bearing on the free end of said transmission housing, a shaft rotatably mounted in said bearing and adapted to be operatively connected to said motor, a circular saw blade on said shaft, a collar slidably adjustable on said bearing and having a flared portion forming one side of a ball bearing groove, a second collar slidably adjustable on said first collar and having one of its ends tapered to form the other side of a ball bearing groove, a ring rotatably mounted around said two collars having a ball bearing groove, ball bearings in said two ball bearing grooves, a hood structure secured to said ring and shielding the upper area of said saw blade, a means for maintaining said hood in a horizontal attitude throughout the arcuate swing movement of said platform, motor, housing and saw blade, two spaced apart track rails on said frame each having an upper inverted V-shaped surface, a material holding platform, and grooved wheels rotatably mounted on said platform and engaging the upper V-shaped surface of said two track rails.

5. In a saw, a frame, a platform operatively hinged to said frame, means for moving said platform to various positions of its swing movement, a motor on said platform, a transmission housing extending from said motor, a bearing on the free end of said transmission housing, a shaft rotatably mounted in said bearing and adapted to be operatively connected to said motor, a circular saw blade on said shaft, a collar slidably adjustable on said bearing and having a flared portion forming one side of a ball bearing groove, a second collar slidably adjustable on said first collar and having one of its ends to form the other side of a ball bearing groove, a ring rotatably mounted around said two collars having a ball bearing groove, and ball bearings in said two ball bearing grooves.

6. In a saw, a frame, a platform operatively hinged to said frame, means for moving said platform to various positions of its swing movement, a motor on said platform, a transmission housing extending from said motor, a bearing on the free end of said transmission housing, a shaft rotatably mounted in said bearing and adapted to be operatively connected to said motor, a circular saw blade on said shaft, a collar slidably adjustable on said bearing and having a flared portion forming one side of a ball bearing groove, a second collar slidably adjustable on said first collar and having one of its ends tapered to form the other side of a ball bearing groove, a ring rotatably mounted around said two collars having a ball bearing groove, ball bearings in said two ball bearing grooves, and a hood structure secured to said ring and shielding the upper area of said saw blade.

References Cited in the file of this patent

UNITED STATES PATENTS

| | | |
|---|---|---|
| 1,095,399 | Huntington | May 5, 1914 |
| 2,320,743 | Nilsen | June 1, 1943 |
| 2,557,672 | McGrath | June 19, 1951 |
| 2,716,402 | Harrison | Aug. 30, 1955 |
| 2,863,440 | Harclerode | Dec. 9, 1958 |